United States Patent
Moore

(10) Patent No.: US 7,156,317 B1
(45) Date of Patent: Jan. 2, 2007

(54) RECIRCULATING FAN THERMOSTAT

(75) Inventor: Glenn A. Moore, Montgomery, IL (US)

(73) Assignee: Braeburn Systems LLC, Montgomery, IL (US)

( * ) Notice: Subject to any disclaimer, the term of this patent is extended or adjusted under 35 U.S.C. 154(b) by 93 days.

(21) Appl. No.: 10/937,572

(22) Filed: Sep. 9, 2004

(51) Int. Cl.
  *F24F 7/00* (2006.01)
  *G05D 23/32* (2006.01)
  *F25D 17/00* (2006.01)

(52) U.S. Cl. .................... 236/49.3; 236/1 C; 62/158; 62/180

(58) Field of Classification Search ............ 62/157, 62/158, 159, 160, 178, 180; 236/1 C, 49.3
  See application file for complete search history.

(56) References Cited

U.S. PATENT DOCUMENTS

| | | | | |
|---|---|---|---|---|
| 4,075,864 A | * | 2/1978 | Schrader | 62/180 |
| 4,838,482 A | * | 6/1989 | Vogelzang | 236/11 |
| 5,428,964 A | * | 7/1995 | Lobdell | 62/176.6 |
| 5,547,017 A | * | 8/1996 | Rudd | 165/244 |
| 6,318,639 B1 | * | 11/2001 | Toth | 236/46 R |
| 6,988,671 B1 | * | 1/2006 | DeLuca | 236/49.3 |

* cited by examiner

*Primary Examiner*—Marc Norman
(74) *Attorney, Agent, or Firm*—Dillis V. Allen, Esq.

(57) ABSTRACT

A programmable thermostat with a heat-cool switch, a temperature value input, and a fan switch with on, auto, and recirculating positions, and a microprocessor that superimposes a fan recirculating mode or cycle on the heat-cool or off modes or cycles by determining when the heat-cool or off cycles have been off for a user selectable time period; 2 hours, for example, and if so initiating a fan cycle for a predetermined time; 12 minutes for example, to provide a more uniform room temperature by mixing hotter and cooler air and cleaner air by running more space air through the heating and cooling system filter assembly.

6 Claims, 3 Drawing Sheets

RECIRCULATING FAN THERMOSTAT

BACKGROUND OF THE INVENTION

Programmable thermostats have gained wide popularity in the last decade because of microprocessor cost reduction, the ease of programming these small microprocessors, and the cost savings and comfort enhancement of programmed temperature adjustments with parameters such as time of day, outside temperature, season of year, and other parameters. Such low cost microprocessors have the capability of functions in excess of those currently being utilized and provide an opportunity for enhanced heating-cooling and fan control not currently utilized at a small incremental cost.

The present invention deals with the circulation of air within the building and particularly the mixing of hot and cold air within the space and the environmental cleanliness of the air. In moderate outside temperatures, in the range of 35 to 80 degrees, the off cycles in both the heating and cooling modes will increase over the bordering colder or hotter ranges. This long off cycle time stagnates the room air and reduces air cleanliness because filtration is off during these periods between heating and cooling cycles. Typically the fan is on during the heating cycle and off as the cycle ends, and the fan is on during the cooling cycle and remains on at the termination of the cooling cycle to recapture residual cooling. So it is known in the industry to extend the fan cycle to increase thermal efficiency. But that is only part of the objective of the present invention. Extending fan cycles past the low or high temperature shut-off does not ameliorate the stagnant air after long periods of cycle shut-off nor does it improve air quality during these off periods.

There have been several systems that provide independent or dependent fan cycles; for example, the Noto, U.S. Pat. No. 5,582,233; the Toth, U.S. Pat. No. 6,318,639; and the Meyer, et al., U.S. Pat. No. 5,765,636.

In the Noto '233 patent, the fan control circuitry 20 is completely independent from the thermostat 46, and thus adds a considerable cost to the system including duplicating a power supply, such as indicated at 26, and requires new connections at FR and Fan-G into the system. Furthermore, the fan in Noto operates its duty cycle at 1½ minutes every 15 minutes, which is too short a time period and too frequent to increase the system efficiency.

In the Toth '639 patent, assigned to Emerson Electric, the fan duty cycle circuitry is contained in the thermostat, but it has an extremely complicated variable "on" time for the fan which requires excessive and unnecessary software. Further, in Toth, the fan mode overrides the normal heat-cool cycle control subjecting the room space to abnormally hot or cool conditions.

In the Meyer, et al. '636 patent, the fan control circuitry 20 is again separate from the thermostat 10. The Meyer, et al. patent is mainly concerned with preventing short cycling of the fan adjacent the heat-cool cycles. There is a brief mention of independent fan operation in Meyer, et al., but this description is silent as to frequency of cycling and duration of cycling so that Meyer, et al. is not deemed pertinent to the present invention.

It is a primary object of the present invention to ameliorate these problems noted above and provide a programmable thermostat with a fan recirculating mode that is independent of the heat-cool and off modes of today's air conditioning systems.

SUMMARY OF THE PRESENT INVENTION

In accordance with the present invention, a programmable thermostat is provided with a heat-cool switch, a temperature values input, and a fan switch with on, auto, and recirculating positions, and a microprocessor that superimposes a fan recirculating mode or cycle on the heat-cool or off modes or cycles by determining when the heat-cool or off cycles have been off for a user selectable time period; 2 hours, for example, and if so, initiating a fan cycle for a predetermined time; 12 minutes for example, to provide a more uniform room temperature by mixing hotter and cooler air and cleaner air by running more space air through the heating and cooling system filter assembly.

During periods when a heating or cooling system is not running, the air in a home becomes stagnant. The recirculating fan feature enables the user of the thermostat to select a programmed fan operation not only when the furnace is running, but also during periods when the system is not calling for heating or cooling. This circulates air continually within the home, providing a more uniform room temperature by mixing the hotter and colder air, and also creates a cleaner environment by running more room air through the filtration system of the heating and cooling system. This feature is available independent of the heating/cooling system being turned off or on.

In current model thermostats, the primary way to provide air circulation within the system when there is no call for heat or cool is to move the fan switch to the "on" position. This forces the fan to run continually, wasting energy and causing unnecessary wear on the fan motor. The recirculating fan feature provides a means of running the fan for a period of 12 minutes during a user selectable time period when the heating or cooling system has not been on.

The heart of the system is a programmed microprocessor in the thermostat, normally required in programmable thermostats, pre-factory programmed to accomplish the additional function of a recirculating fan. The recirculating fan mode is in essence superimposed on the thermostat conventional heat-off-cool modes and in cases where the furnace has independent logic for turning on and off the fan in the heat/cool modes, the present system will not override. The present microprocessor function is in addition to the heat-cool cycle and fan functions whether they be programmed by the microprocessor itself or logic external to the microprocessor, such as in a gas furnace control. In any event, the microprocessor is programmed according to the present invention in any of the heat, cool or off switch modes to superimpose a fan cycle during any period that the heat or cooling cycle is off for a user selectable time period, or intermittently when the heat-cool switch is in the off position.

This microprocessor includes a suitable timer that is reset to zero at the end of a normal heat-cool cycle, or the completion of the special fan recirculation cycle. After determining the timer has elapsed for the user selected time period(range ½-3 hours) without heat-cooling cycles being called, the microprocessor initiates a fan cycle of 12 minutes (8–15 minutes range). In the event the heat-cool cycle is initiated after the fan recirculation cycle has begun, the recirculating fan cycle is terminated and the normal heat-cool cycle is resumed, and the timer is reset to zero. The timer is reset when the normal heat-cool cycle is complete. At the end of the independent 12 minute independent recirculating fan cycle, the microprocessor also resets the timer. This resets the microprocessor to determine whether another period, based on the user selected off time, has passed before another recirculating fan cycle of 12 minutes may start.

It should be understood that the present program does not modify the heating-cooling fan functions and cycles of the thermostat, it only is superimposed on those cycles. It senses the initiation and termination of the conventional heating-cooling-off functions and superimposes the fan recirculating cycle after the termination of the standard cycle for a predetermined period.

DETAILED DESCRIPTION OF THE PREFERRED EMBODIMENT

Figure 2:
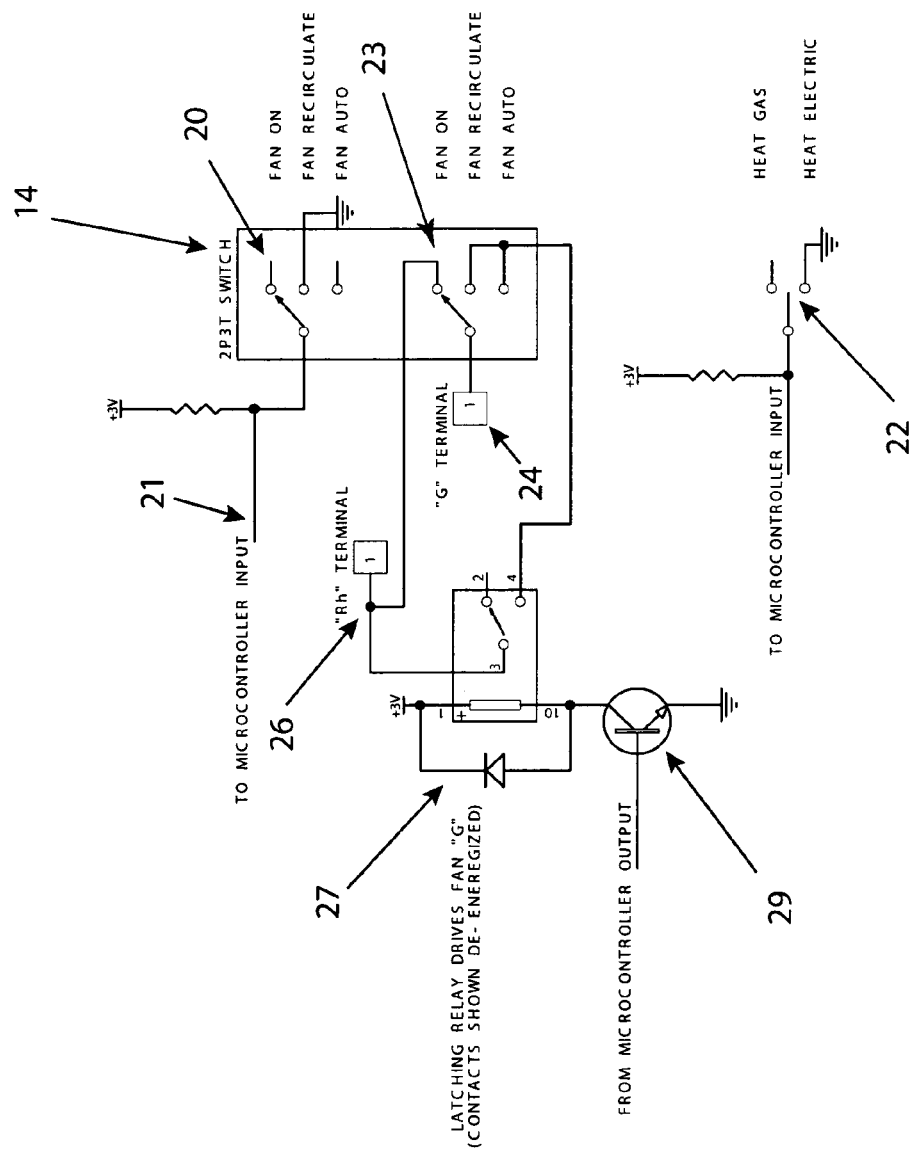
FIG. 2 is a schematic for the fan controller.
Figure 3:
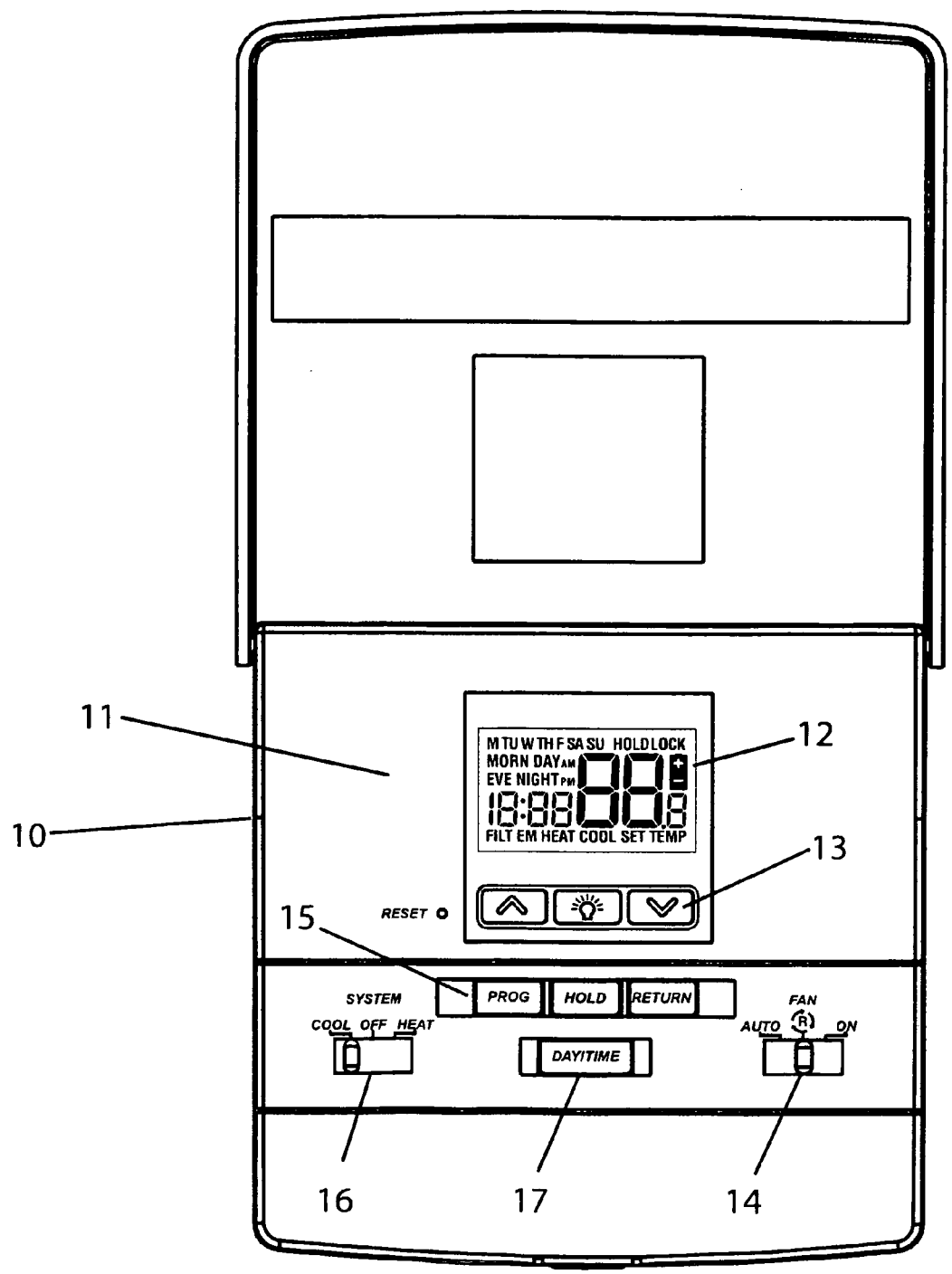
FIG. 3 is a front view of the thermostat housing with switches and LCD display.

Referring to the drawings and particularly FIG. 3, a programmable electronic thermostat 10 is illustrated including a housing 11, an LCD display 12, temperature control switches 13, programming switches 15, a system-cool-off heat switch 16, a time switch 17, and an auto-recirculate-on switch 14 for the fan. The fan switch 14 is also illustrated in FIG. 2 and is seen to be a 2P, 3T switch with poles 20 providing an output to the input 21 of the microprocessor to tell the microprocessor what the state of the fan switch 14 is. A gas-electric switch 22 shown at the bottom of FIG. 2, provides an input to the microprocessor so that the furnace logic and not the thermostat controls the fan operation during the gas heating cycle. In the fan "on" position illustrated, pole 23 connects fan terminal 24 to 24-volt power from RH terminal 26. In the fan auto and recirculate positions, fan operation is controlled by a latching relay 27 shown with its contacts in the deenergized position in FIG. 2. In the recirculate or auto positions, the fan operation is controlled by the relay state which is in turn controlled by the output of the microprocessor through switch 29.

While in the fan auto mode, the fan terminal 24 is essentially controlled in the same fashion as presently available thermostats utilizing furnace logic or the microprocessor. That is, the fan terminal 24 is energized upon call for cooling and deenergized after a residual cool timer expires. When in the heating position, terminal 24 is energized upon calling for heat, and deenergized when the call is satisfied.

According to the present invention, an additional mode is provided in the fan recirculate position of switch 14. In this position, the microprocessor represented by the algorithm of FIG. 1, energizes terminal 24 for a period of 12 minutes under the condition that the call for heat or cool has not been made for a period selected by the user although the ranges in the Summary of the Invention are within the scope of this technology. Any call for heat or cool will zero a resettable timer 35 shown in FIG. 1, and the control resumes operation as if in the fan auto mode. After the call for heat has been satisfied, the 2 hour timer 35 will begin to increment. The fan recirculate function is available in heat, off and cool modes of operation.

Figure 1:
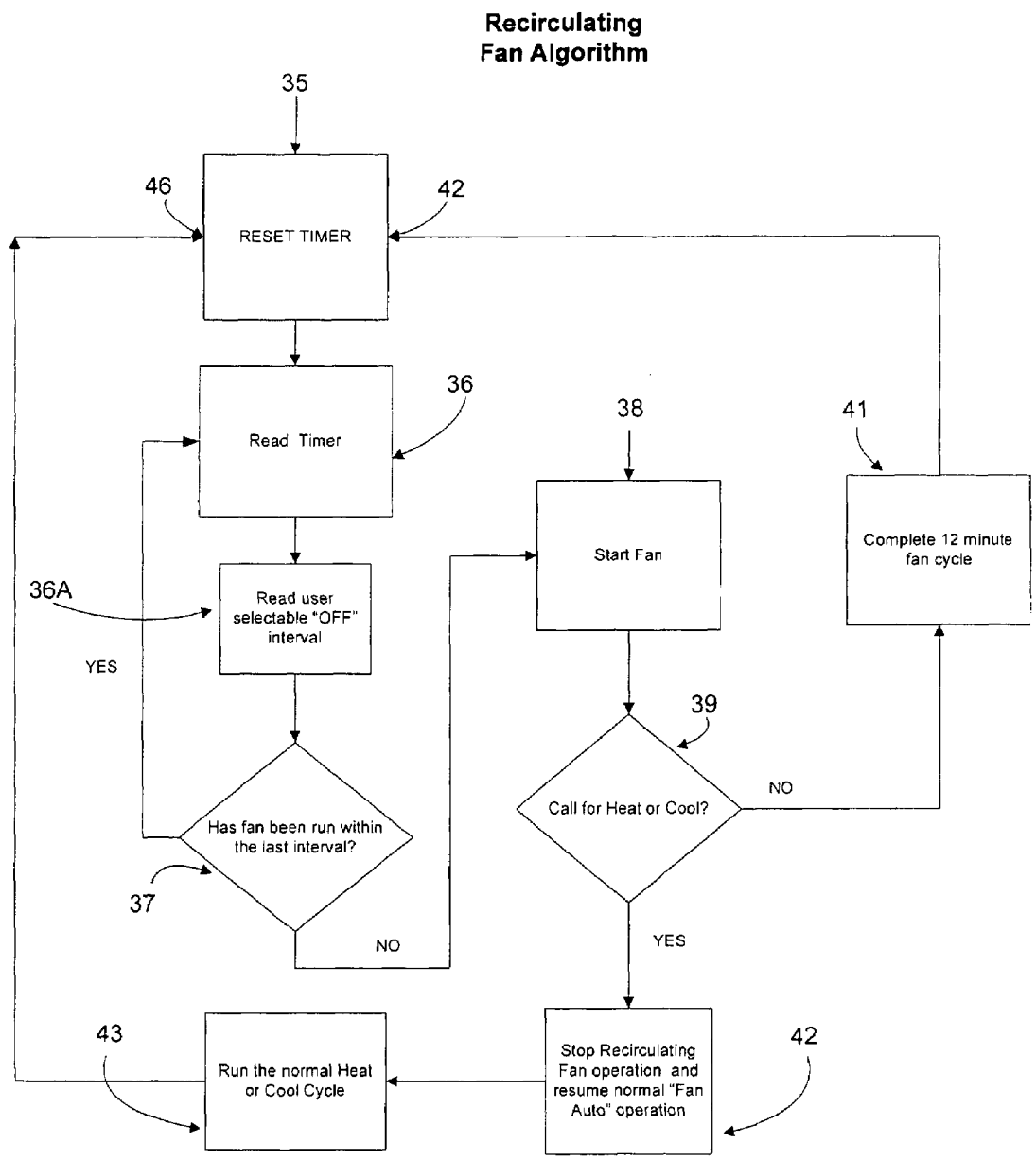
FIG. 1 is a algorithm or flow sheet for the present electronic thermostat.

Referring to the algorithm of FIG. 1, the resettable timer 35 is read at 36 and compared to the user selectable value for the off period at 36A, and if satisfied, the fan off function and the off time value is read at 37, is performed at 37, and the fan is started at 38. If there is no call for heat at 39, the complete 12 minute cycle is effected at 41. At the completion of the 12 minute cycle, the timer is reset at 42. If there is a call for heat during this period, the fan recirculation call is stopped at 42 and the normal auto fan operation is initiated at 43, and at the end of that cycle, the timer is reset at 46.

The invention claimed is:

1. A programmable thermostat having an additional fan recirculate function, comprising: a fan switch including fan on, fan auto and fan recirculate positions, a cool-heat switch, a microprocessor for controlling heat-cool cycles and fan cycles in response to upper and lower temperature values, means for connecting the fan to a power source in response to the fan switch being in the fan on position, said microprocessor controlling the fan cycle when the fan switch is in the fan recirculate position including determining when the heat-cool cycles have been off for a predetermined period and in response thereto initiating a fan cycle for a predetermined fixed, non-adjustable time that may be terminated by the heat-cool cycles, said microprocessor having a resettable timer and means for reading the timer to determine when the heat-cool cycle predetermined off period has expired and in response thereto initiates a fixed fan cycle and after the fan cycle is complete resets the resettable timer to zero.

2. A programmable thermostat as defined in claim 1, wherein the predetermined period of heat-cool cycle off is in the range of ½ to 3 hours.

3. A programmable thermostat as defined in claim 1, wherein the predetermined period of heat-cool cycle off is user selectable.

4. A programmable thermostat as defined in claim 1, wherein the predetermined fixed, non-adjustable time for the fan cycle is in the range of 8 to 15 minutes.

5. A programmable thermostat as defined in claim 1, wherein the predetermined time for the fan cycle is about 12 minutes.

6. A programmable thermostat as defined in claim 1, said microprocessor after the fan cycle is initiated determines if a heat-cool cycle has been called for and if so fails the predetermined time fan cycle and permits the fan auto function.

* * * * *